(12) United States Patent
Satoh

(10) Patent No.: US 11,483,499 B2
(45) Date of Patent: Oct. 25, 2022

(54) IMAGING APPARATUS FOR ADDITION OF PIXELS ON THE BASIS OF A TEMPERATURE OF AN IMAGING ARRAY

(71) Applicant: SONY SEMICONDUCTOR SOLUTIONS CORPORATION, Kanagawa (JP)

(72) Inventor: Naoya Satoh, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 17/310,523

(22) PCT Filed: Jan. 22, 2020

(86) PCT No.: PCT/JP2020/002075
§ 371 (c)(1),
(2) Date: Aug. 6, 2021

(87) PCT Pub. No.: WO2020/166284
PCT Pub. Date: Aug. 20, 2020

(65) Prior Publication Data
US 2022/0159203 A1 May 19, 2022

(30) Foreign Application Priority Data
Feb. 15, 2019 (JP) .............................. JP2019-025596

(51) Int. Cl.
*H04N 5/355* (2011.01)
*G01K 3/00* (2006.01)
(Continued)

(52) U.S. Cl.
CPC ............. *H04N 5/355* (2013.01); *G01K 3/005* (2013.01); *H04N 5/345* (2013.01); *H04N 5/347* (2013.01);
(Continued)

(58) Field of Classification Search
CPC ........ H04N 5/355; H04N 5/345; H04N 5/347; H04N 5/37455; H04N 5/378; G01K 3/005
See application file for complete search history.

(56) References Cited

U.S. PATENT DOCUMENTS

2009/0263044 A1  10/2009  Imagawa et al.
2012/0092525 A1*  4/2012  Kusaka ................. H04N 5/349
                                                    348/231.99
(Continued)

FOREIGN PATENT DOCUMENTS

JP  2008-294689 A  12/2008
JP  2010-028423 A  2/2010
(Continued)

OTHER PUBLICATIONS

International Search Report and Written Opinion of PCT Application No. PCT/JP2020/002075, dated Mar. 17, 2020, 08 pages of ISRWO.

*Primary Examiner* — Nicholas G Giles
(74) *Attorney, Agent, or Firm* — Chip Law Group

(57) ABSTRACT

An imaging apparatus of the present disclosure includes: a pixel array in which a plurality of pixels including a first partial pixel, a second partial pixel, and a third partial pixel are arranged; and an addition processor that adds, for each of the pixels, a third partial pixel signal generated from the third partial pixel to either one of a first partial pixel signal generated from the first partial pixel and a second partial pixel signal generated from the second partial pixel, on the basis of a temperature of the pixel array.

11 Claims, 15 Drawing Sheets

EXAMPLE OF PIXEL ADDITION CONTROL BASED ON TEMPERATURE

(51) Int. Cl.
*H04N 5/345* (2011.01)
*H04N 5/347* (2011.01)
*H04N 5/3745* (2011.01)
*H04N 5/378* (2011.01)

(52) U.S. Cl.
CPC ......... *H04N 5/378* (2013.01); *H04N 5/37455* (2013.01)

(56) References Cited

U.S. PATENT DOCUMENTS

| | | |
|---|---|---|
| 2014/0240536 A1 | 8/2014 | Kanemitsu et al. |
| 2016/0105622 A1 | 4/2016 | Tamaki |
| 2019/0246052 A1* | 8/2019 | Huang ................... H04N 5/361 |

FOREIGN PATENT DOCUMENTS

| | | |
|---|---|---|
| JP | 2011-114680 A | 6/2011 |
| JP | 2014-168112 A | 9/2014 |
| JP | 2015-089036 A | 5/2015 |
| JP | 2018-014740 A | 1/2018 |
| WO | 2008/047664 A1 | 4/2008 |

* cited by examiner

[FIG. 1]
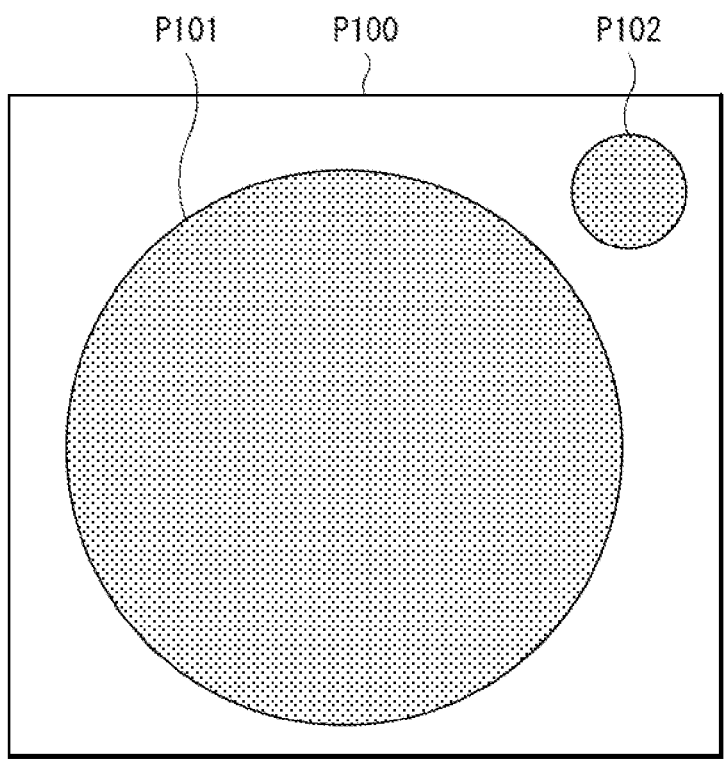

[FIG. 2]
COMPARATIVE EXAMPLE
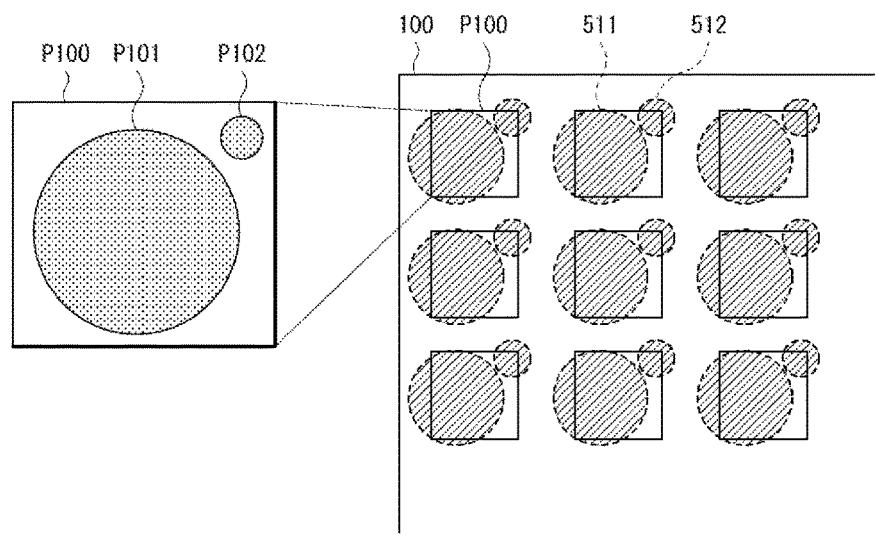

[FIG. 3]
COMPARATIVE EXAMPLE
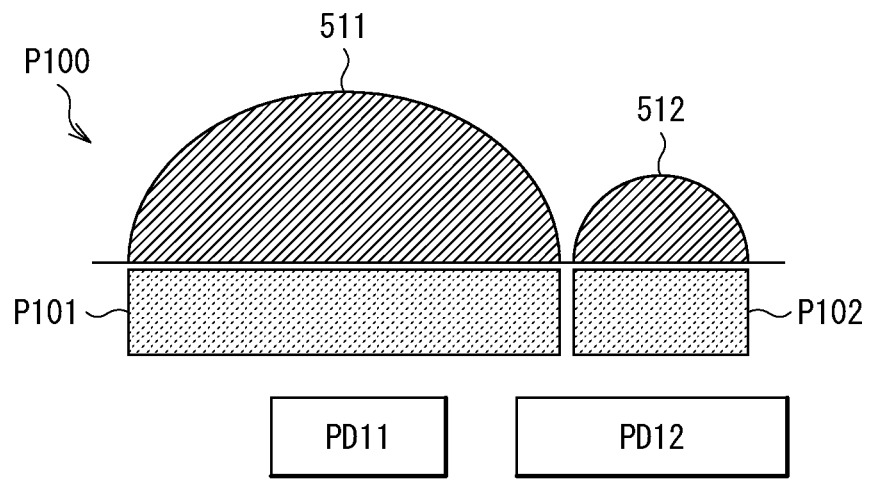
[FIG. 4]
COMPARATIVE EXAMPLE
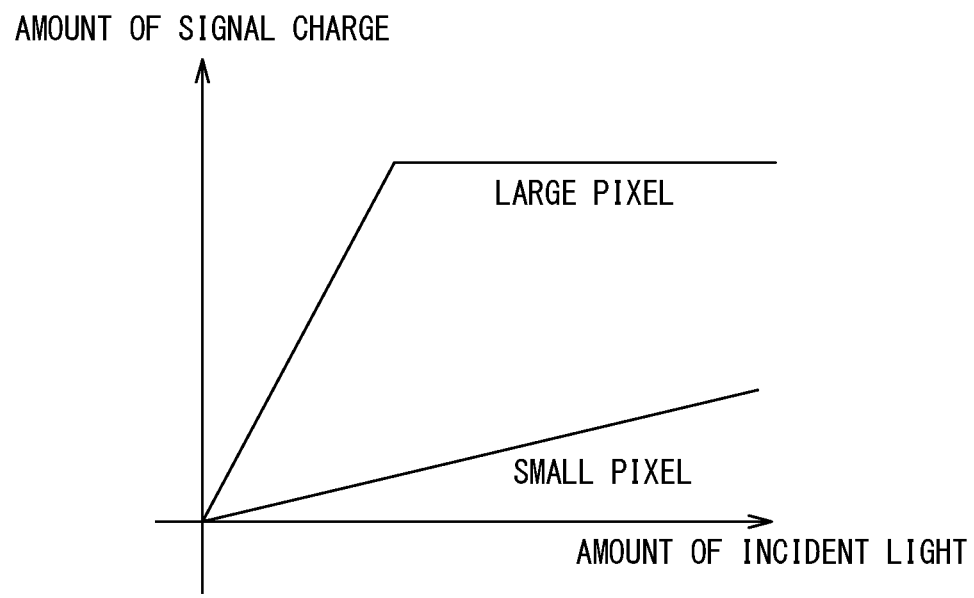

[FIG. 5]
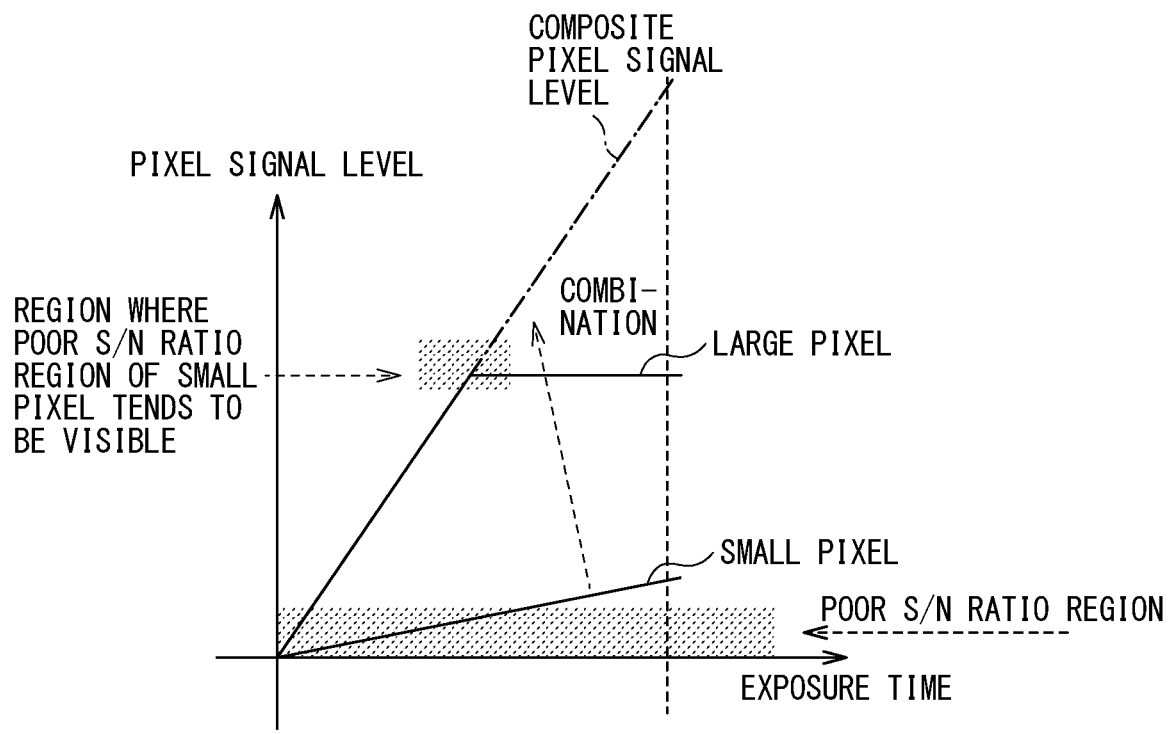

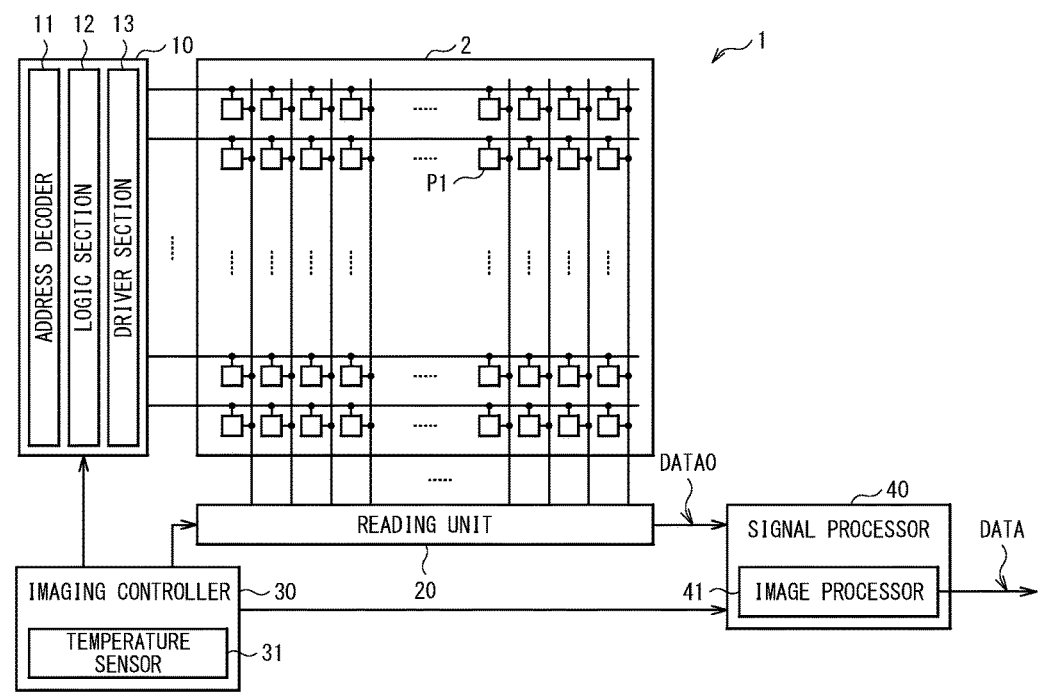
[FIG. 6]

[FIG. 7]
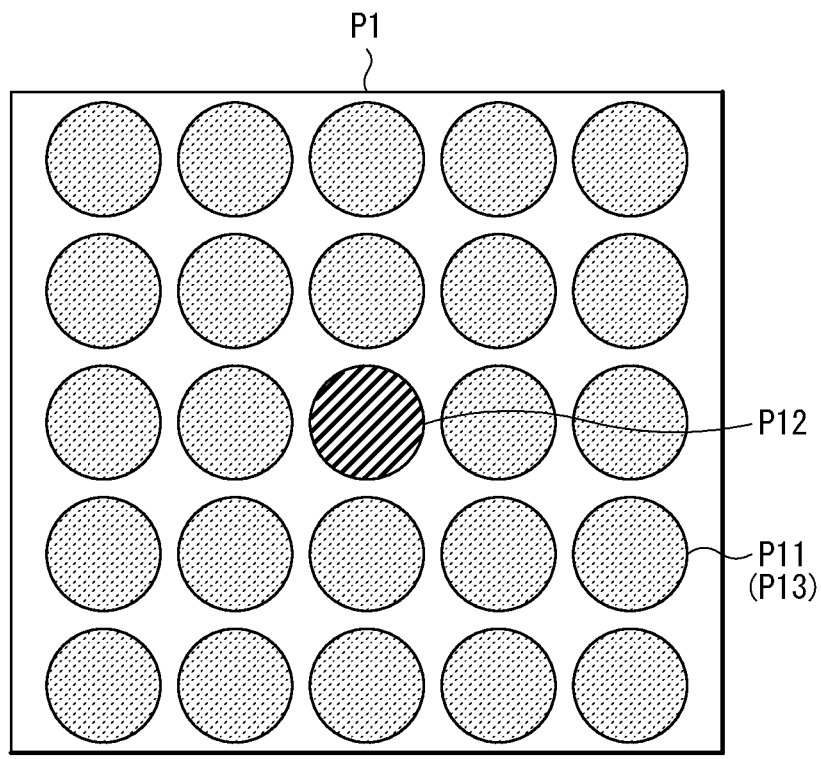

[FIG. 8]
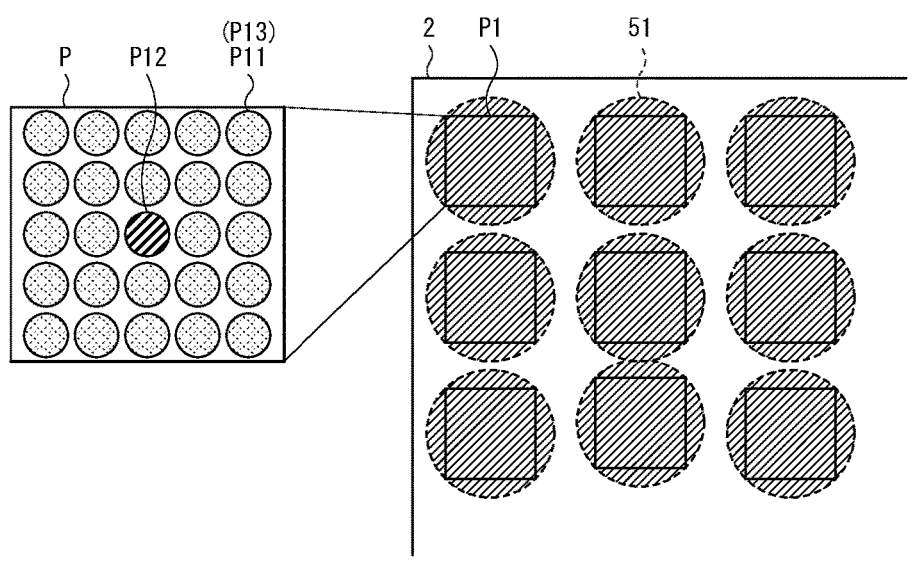

[FIG. 9]
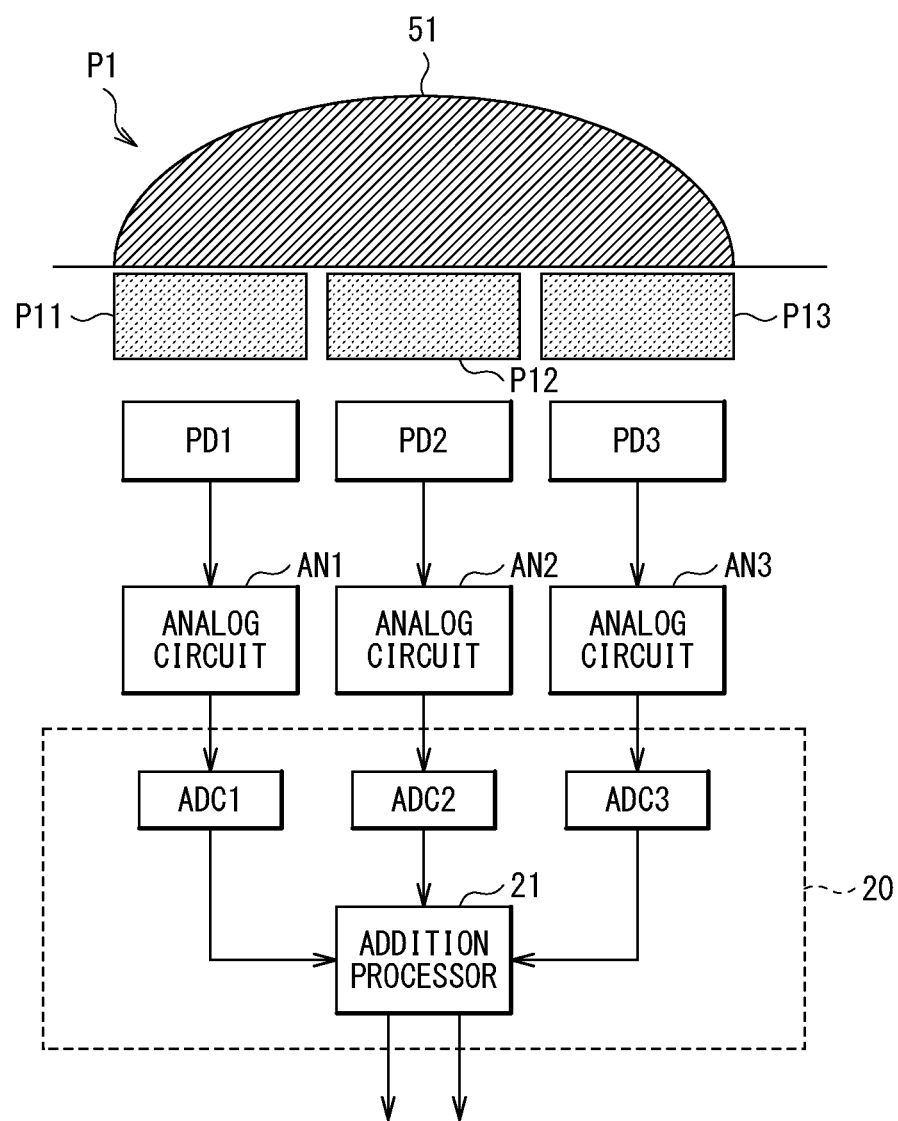

[FIG. 10]
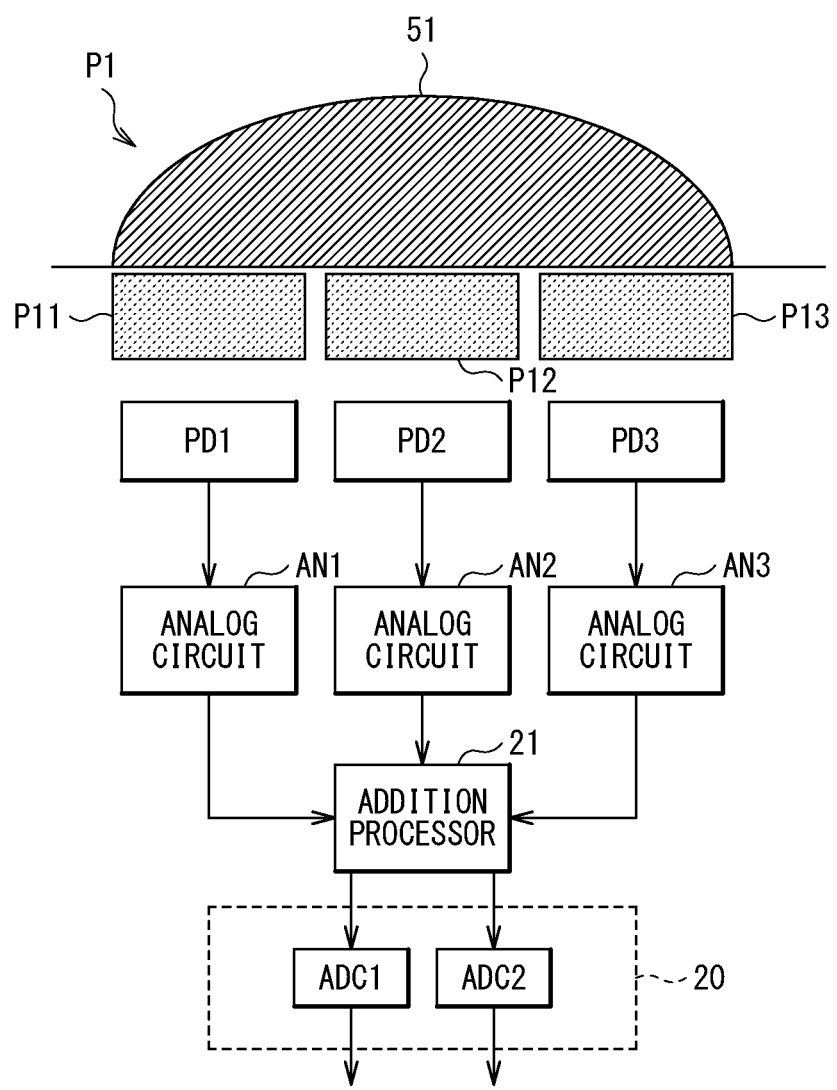

[FIG. 11]
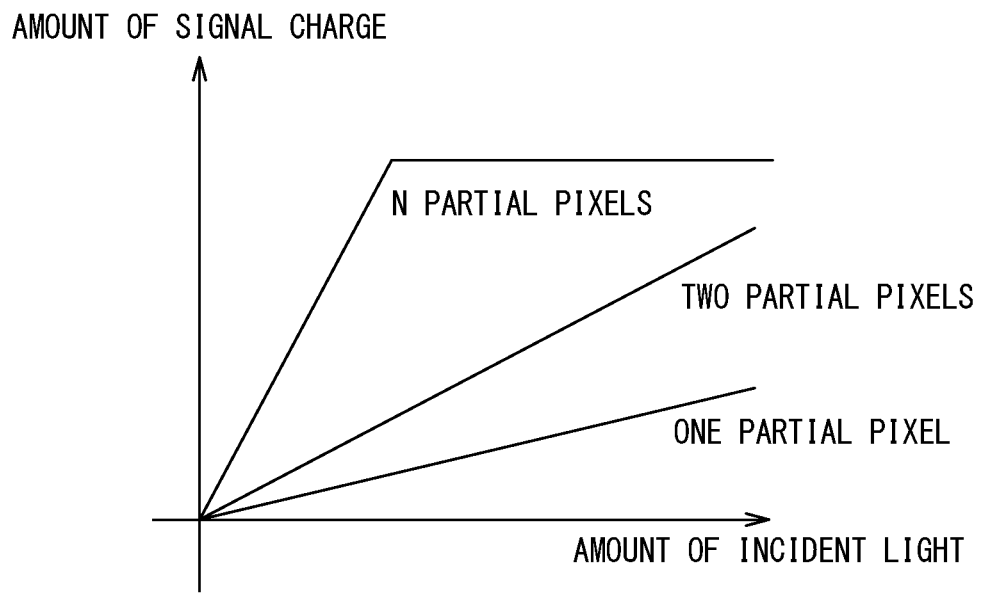
[FIG. 12]
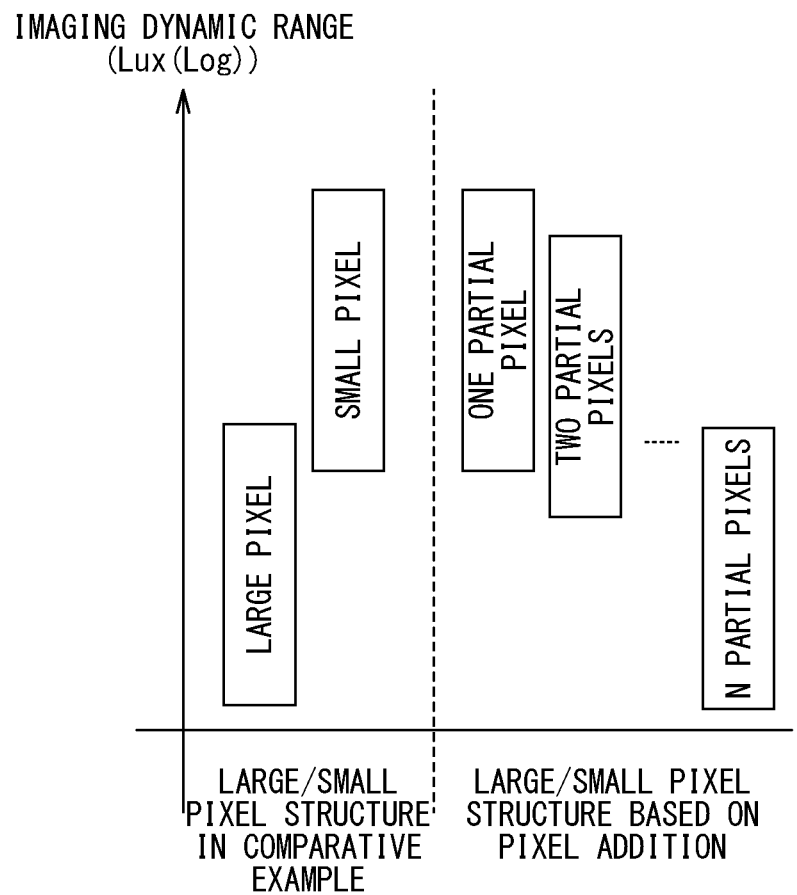

[FIG. 13]
EXAMPLE OF PIXEL ADDITION CONTROL BASED ON TEMPERATURE
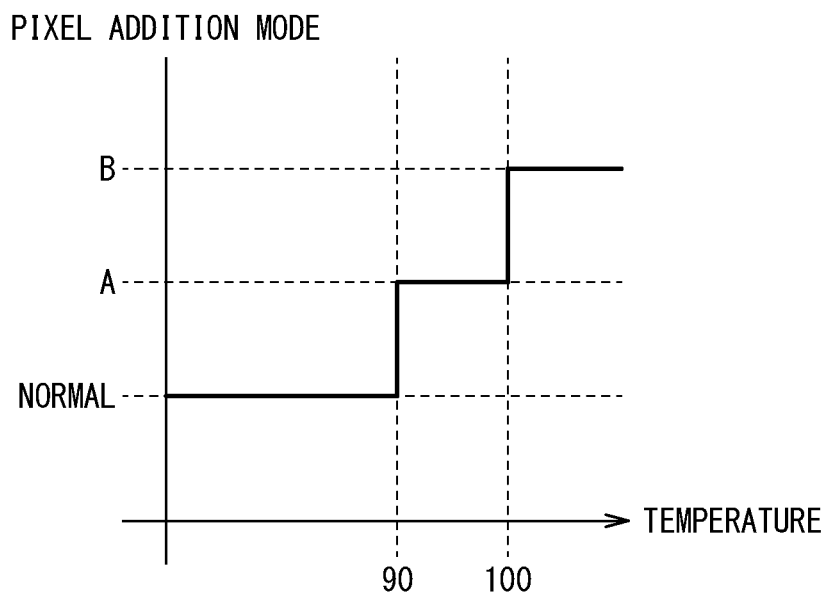
[FIG. 14A]
DURING NORMAL
OPERATION
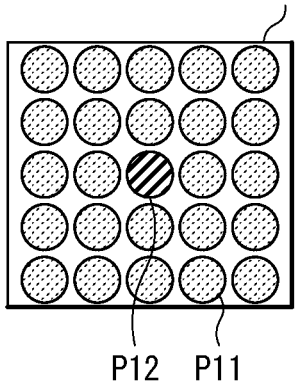
[FIG. 14B]
AT HIGH TEMPERATURE
MODE A
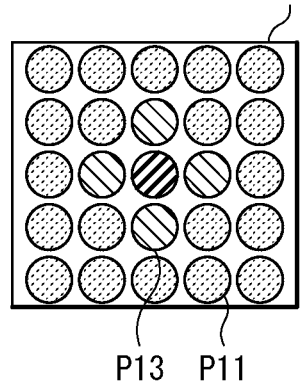
[FIG. 14C]
AT HIGH TEMPERATURE
MODE B
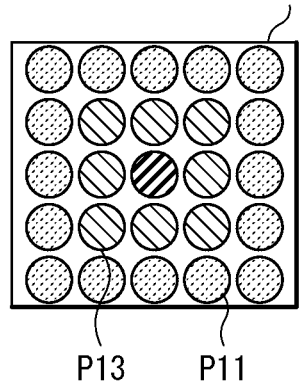

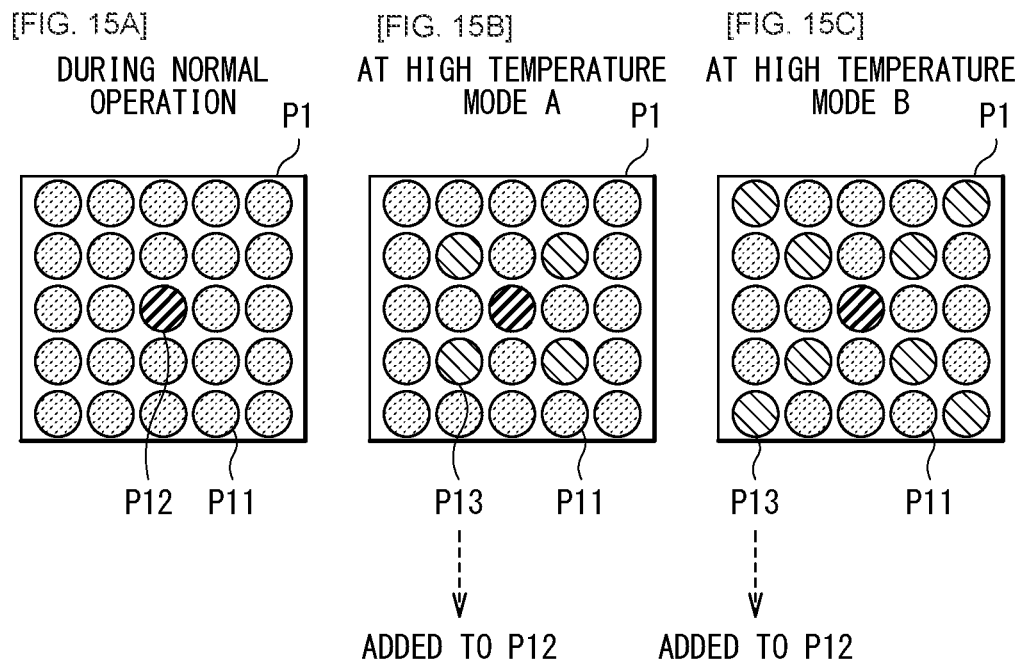
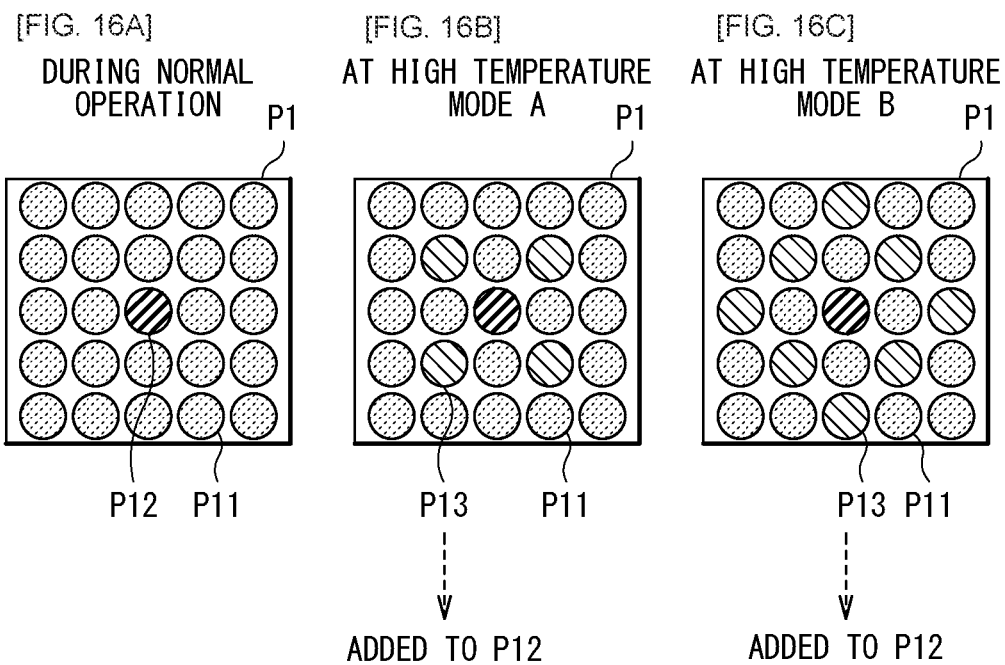

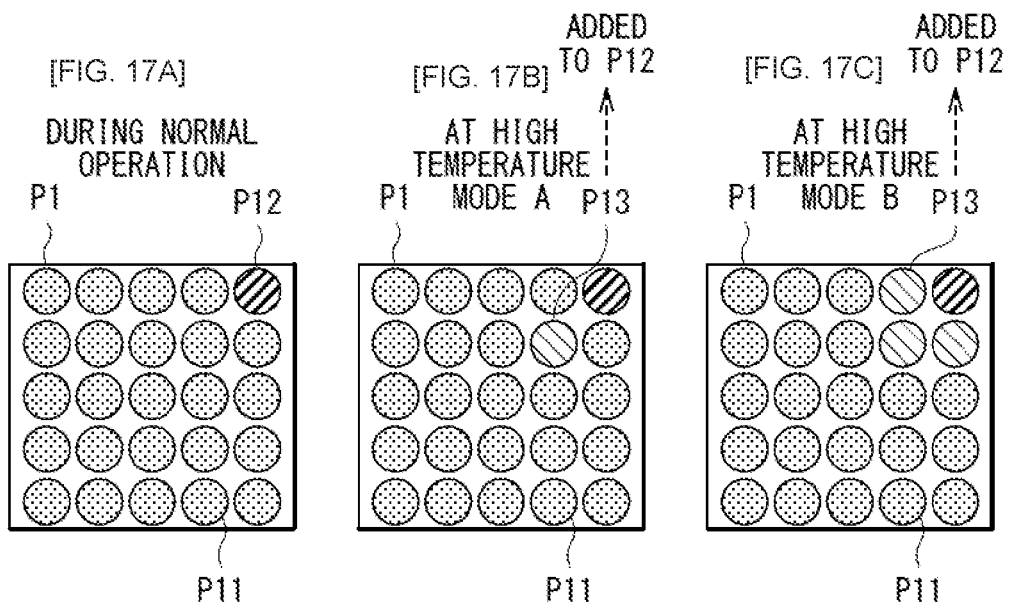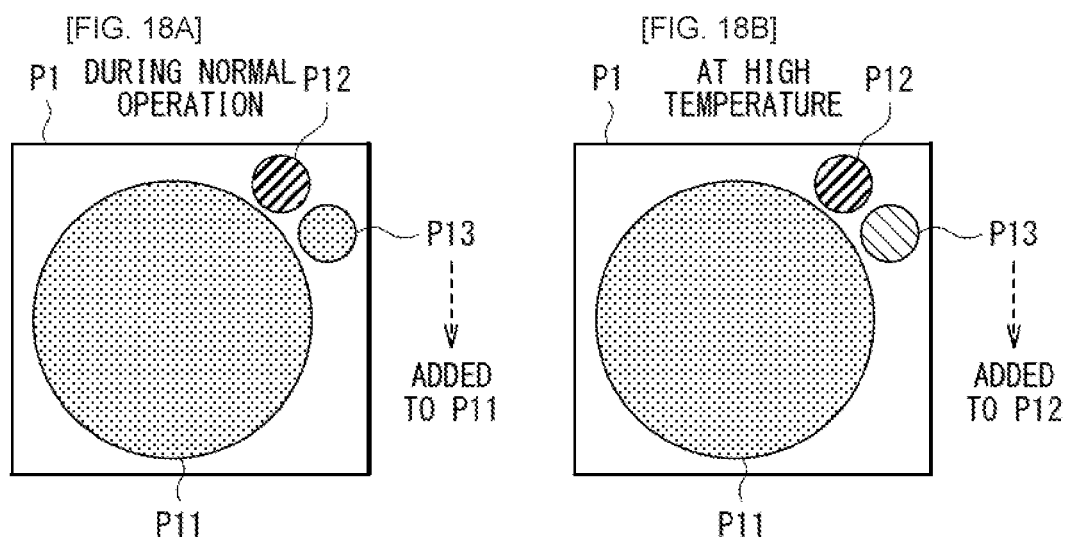

[FIG. 19]
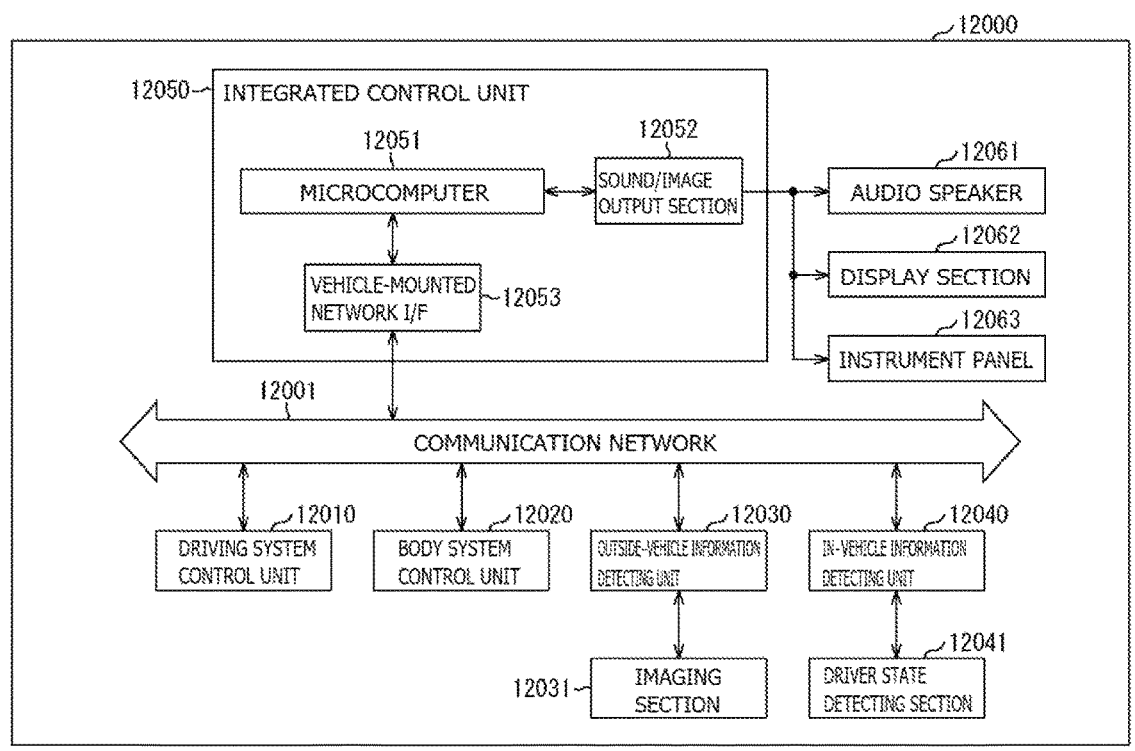

[FIG. 20]
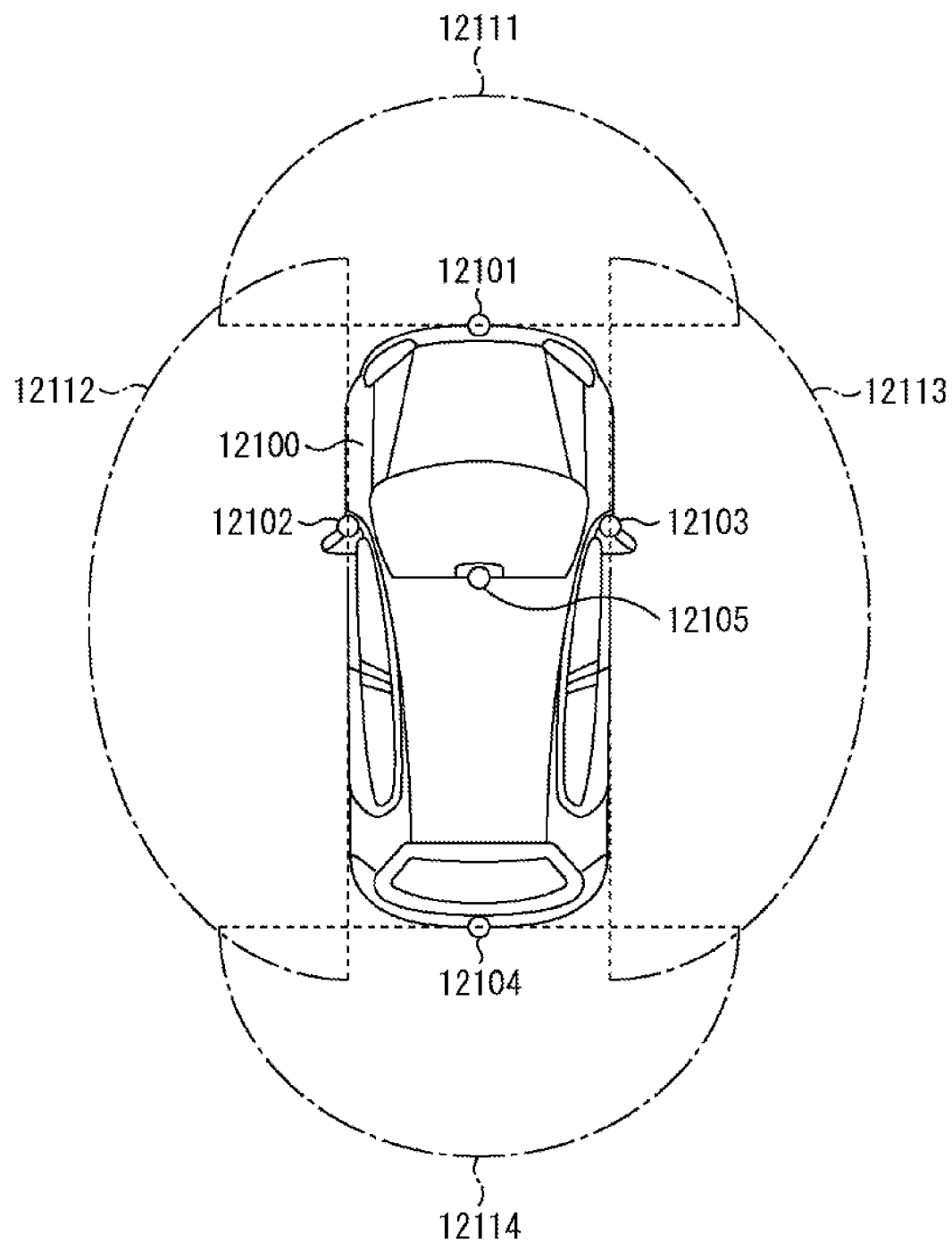

IMAGING APPARATUS FOR ADDITION OF PIXELS ON THE BASIS OF A TEMPERATURE OF AN IMAGING ARRAY

CROSS REFERENCE TO RELATED APPLICATIONS

This application is a U.S. National Phase of International Patent Application No. PCT/JP2020/002075 filed on Jan. 22, 2020, which claims priority benefit of Japanese Patent Application No. JP 2019-025596 filed in the Japan Patent Office on Feb. 15, 2019. Each of the above-referenced applications is hereby incorporated herein by reference in its entirety.

TECHNICAL FIELD

The present disclosure relates to an imaging apparatus including a plurality of imaging pixels.

BACKGROUND ART

There are techniques of expanding an imaging dynamic range in an imaging apparatus by combining pixel signals from a plurality of imaging pixels (see PTLs 1 to 3). For example, there is a technique of expanding an imaging dynamic range by performing an addition process of pixel signals from a plurality of imaging pixels in accordance with brightness.

CITATION LIST

Patent Literature

PTL 1: Japanese Unexamined Patent Application Publication No. 2008-294689
PTL 2: Japanese Unexamined Patent Application Publication No. 2010-28423
PTL 3: Japanese Unexamined Patent Application Publication No. 2015-89036

SUMMARY OF THE INVENTION

When combining pixel signals from a plurality of imaging pixels, noise is amplified by temperature rise.

It is desirable to provide an imaging apparatus that makes it possible to expand an imaging dynamic range while suppressing noise.

An imaging apparatus according to one embodiment of the present disclosure includes: a pixel array in which a plurality of pixels including a first partial pixel, a second partial pixel, and a third partial pixel are arranged; and an addition processor that adds, for each of the pixels, a third partial pixel signal generated from the third partial pixel to either one of a first partial pixel signal generated from the first partial pixel and a second partial pixel signal generated from the second partial pixel, on the basis of a temperature of the pixel array.

In the imaging apparatus according to one embodiment of the present disclosure, for each of the pixels, the third partial pixel signal generated from the third partial pixel is added to either one of the first partial pixel signal generated from the first partial pixel and the second partial pixel signal generated from the second partial pixel, on the basis of the temperature of the pixel array.

BRIEF DESCRIPTION OF DRAWINGS

FIG. 1 is a schematic plan view of an example of a pixel structure in an imaging apparatus according to a comparative example.

FIG. 2 is a schematic plan view of an example configuration of a pixel array in the imaging apparatus according to the comparative example.

FIG. 3 is a schematic cross-sectional view of an example of the pixel structure in the imaging apparatus according to the comparative example.

FIG. 4 is an explanatory diagram schematically illustrating an example of the relationship between an amount of incident light on an imaging pixel and an amount of signal charge in the imaging apparatus according to the comparative example.

FIG. 5 is an explanatory diagram schematically illustrating concerns in a case where an imaging dynamic range is expanded by using the pixel structure in the imaging apparatus according to the comparative example.

FIG. 6 is a block diagram schematically illustrating an example of an imaging apparatus according to a first embodiment of the present disclosure.

FIG. 7 is a schematic plan view of an example of a pixel structure in the imaging apparatus according to the first embodiment.

FIG. 8 is a schematic plan view of an example configuration of a pixel array in the imaging apparatus according to the first embodiment.

FIG. 9 is a block diagram schematically illustrating a first example of a pixel structure and a method of an addition process of pixel signals in the imaging apparatus according to the first embodiment.

FIG. 10 is a block diagram schematically illustrating a second example of the pixel structure and the method of the addition process of pixel signals in the imaging apparatus according to the first embodiment.

FIG. 11 is an explanatory diagram schematically illustrating an example of the relationship between an amount of incident light on an imaging pixel and an amount of signal charge in the imaging apparatus according to the first embodiment.

FIG. 12 is an explanatory diagram schematically illustrating a difference in the imaging dynamic range between the imaging apparatus according to the comparative example and the imaging apparatus according to the first embodiment.

FIG. 13 is an explanatory diagram illustrating an overview of pixel addition control based on temperature in the imaging apparatus according to the first embodiment.

FIGS. 14A, 14B, and 14C are explanatory diagrams schematically illustrating a first example of the pixel addition control based on the temperature in the imaging apparatus according to the first embodiment.

FIGS. 15A, 15B, and 15C are explanatory diagrams schematically illustrating a second example of the pixel addition control based on the temperature in the imaging apparatus according to the first embodiment.

FIGS. 16A, 16B, and 16C are explanatory diagrams schematically illustrating a third example of the pixel addition control based on the temperature in the imaging apparatus according to the first embodiment.

FIGS. 17A, 17B, and 17C are explanatory diagrams schematically illustrating a fourth example of the pixel addition control based on the temperature in the imaging apparatus according to the first embodiment.

FIGS. 18A and 18B are explanatory diagrams schematically illustrating an example of a pixel structure and pixel addition control based on temperature in an imaging apparatus according to a second embodiment.

FIG. 19 is a block diagram depicting an example of schematic configuration of a vehicle control system.

FIG. 20 is a diagram of assistance in explaining an example of installation positions of an outside-vehicle information detecting section and an imaging section.

MODES FOR CARRYING OUT THE INVENTION

In the following, description is given of embodiments of the present disclosure in detail with reference to the drawings. It is to be noted that the description is given in the following order.

0. Comparative Example (FIGS. 1 to 5)
1. First Embodiment (FIGS. 6, 7, 8, 9, 10, 11, 12, 13, 14A, 14B, 14C, 15A, 15B, 15C, 16A, 16B, 16C, 17A, 17B, and 17C)
  1.1 Configuration and Operation of Imaging Apparatus According to First Embodiment
  1.2 Effects
2. Second Embodiment (FIGS. 18A and 18B)
3. Examples of Application to Mobile Body (FIGS. 19 to 20)
4. Other Embodiments

0. COMPARATIVE EXAMPLE (Overview and Issues of Imaging Apparatus According to Comparative Example)

FIG. 1 schematically illustrates an example planar configuration of a pixel structure in an imaging apparatus according to a comparative example. FIG. 2 schematically illustrates an example planar configuration of a pixel array 100 in the imaging apparatus according to the comparative example. FIG. 3 schematically illustrates an example cross-sectional configuration of the pixel structure in the imaging apparatus according to the comparative example.

The pixel structure in the imaging apparatus according to the comparative example illustrated in FIG. 1 is configured such that one imaging pixel P100 includes a large pixel P101 with a large pixel area (light receiving area) and a small pixel P102 with a small pixel area.

The imaging apparatus according to the comparative example includes the pixel array 100 in which a plurality of such imaging pixels P100 are arranged in a matrix as illustrated in FIG. 2. On the imaging pixels P100, an on-chip lens 511 is disposed at a position corresponding to the large pixel P101, and an on-chip lens 512 is disposed at a position corresponding to the small pixel P102.

Further, as illustrated in FIG. 3, a photodiode PD11 is disposed at a position corresponding to the large pixel P101, and a photodiode PD12 is disposed at a position corresponding to the small pixel P102. The photodiodes PD11 and PD12 are photoelectric converters that generate an amount of electric charge corresponding to an amount of received light and store the electric charge therein. In the imaging apparatus, pixel signals corresponding to the amounts of signal charge generated by the photodiodes PD11 and PD12 are generated. On the photodiode PD11, light condensed by the on-chip lens 511 is incident through the large pixel P101. On the photodiode PD12, light condensed by the on-chip lens 512 is incident through the small pixel P102. Light receiving sensitivity of the photodiode PD12 is smaller than light receiving sensitivity of the photodiode PD11.

FIG. 4 schematically illustrates an example of the relationship between the amount of incident light on the imaging pixel P100 (horizontal axis) and the amount of signal charge (vertical axis) in the imaging apparatus according to the comparative example.

As illustrated in FIG. 4, in the imaging pixel P100 in the imaging apparatus according to the comparative example, pixel sensitivity of the small pixel P102 is smaller than pixel sensitivity of the large pixel P101, due to the difference in pixel area and the difference in light receiving sensitivity between the photodiodes PD11 and PD12. The amount of signal charge generated by the photodiode PD11 corresponding to the large pixel P101 is saturated at a predetermined amount of incident light.

FIG. 5 schematically illustrates concerns in a case where an imaging dynamic range is expanded by using the pixel structure in the imaging apparatus according to the comparative example. In FIG. 5, the horizontal axis indicates exposure time, and the vertical axis indicates a level of the pixel signal.

On the basis of characteristics illustrated in FIG. 4, the level of the pixel signal generated by the large pixel P101 is saturated at a predetermined exposure time. Hence, as illustrated in FIG. 5, in the imaging apparatus according to the comparative example, the pixel signal generated by the large pixel P101 is used as the pixel signal of the imaging pixel P100 in a case where the exposure time is less than the predetermined exposure time. In a case where the exposure time reaches the predetermined exposure time, a composite pixel signal obtained by adding the pixel signal generated by the small pixel P102 to the pixel signal generated by the large pixel P101 is used as the pixel signal of the imaging pixel P100. This makes it possible to expand the imaging dynamic range.

Here, in the small pixel P102, as illustrated in FIG. 5, there is a lot of noise at exposure time shorter than the predetermined exposure time, and the generated pixel signal has a poor S/N ratio (signal-to-noise ratio). In a case of combining the pixel signal generated by the large pixel P101 and the pixel signal generated by the small pixel P102, the noise due to the small pixel P102 tends to be visible in a combination boundary region. This noise increases as temperature around the imaging pixel P100 rises. In a case of the imaging apparatus according to the comparative example, because the pixel sensitivity is determined by the difference in pixel area, the pixel sensitivity of the large pixel P101 and the pixel sensitivity of the small pixel P102 are each fixed. Therefore, in a case where the temperature around the imaging pixel P100 rises and the noise increases in the combination boundary region, it is not possible to suppress the noise by bringing the pixel sensitivity of the small pixel P102 close to the pixel sensitivity of the large pixel P101. In this case, it is possible to suppress the noise in the combination boundary region by adjusting a shutter ratio between the large pixel P101 and the small pixel P102. For example, the shutter ratio is adjusted to make the exposure time of the small pixel P102 longer than that of the large pixel P101. However, in a case where the noise in the combination boundary region is suppressed by adjusting the shutter ratio, a shutter is released at different times. Therefore, coloring occurs in a case where a subject moves.

Hence, it is desirable to develop a technology that makes it possible to expand an imaging dynamic range while suppressing noise caused when temperature rises.

1. FIRST EMBODIMENT

[1.1 Configuration and Operation of Imaging Apparatus According to First Embodiment] (Overview of imaging apparatus)

FIG. 6 schematically illustrates an example configuration of an imaging apparatus 1 according to a first embodiment of the present disclosure.

The imaging apparatus 1 according to the first embodiment includes a pixel array 2, a scanning unit 10, a reading unit 20, an imaging controller 30, and a signal processor 40. The scanning unit 10 includes an address decoder 11, a logic section 12, and a driver section 13. The imaging controller 30 includes a temperature sensor 31. The signal processor 40 includes an image processor 41.

In the pixel array 2, a plurality of imaging pixels P1 are arranged in a matrix.

The scanning unit 10 sequentially drives the imaging pixels P1 in the pixel array 2, in units of pixel lines, on the basis of an instruction from the imaging controller 30.

The address decoder 11 selects, on the basis of an address signal supplied from the imaging controller 30, a pixel line corresponding to an address indicated by the address signal, in the pixel array 2. The logic section 12 and the driver section 13 generate signals corresponding to each pixel line.

The reading unit 20 includes a plurality of AD (Analog to Digital) converters. The AD converter performs AD conversion on the analog pixel signal generated by the imaging pixel P1 of the pixel array 2 to generate a digital pixel signal. The reading unit 20 generates and outputs an image signal DATA0 on the basis of the digital pixel signal.

The imaging controller 30 controls operation of the imaging apparatus 1, by supplying control signals to the scanning unit 10, the reading unit 20, and the signal processor 40 to control the operation of these circuits. Specifically, the imaging controller 30 controls the scanning unit 10 to sequentially drive the imaging pixels P1 in the pixel array 2 in units of pixel lines by, for example, supplying an address signal to the scanning unit 10. Further, the imaging controller 30 controls the reading unit 20 to generate the image signal DATA0 on the basis of the pixel signal from the imaging pixel P1, by supplying a control signal to the reading unit 20. Further, the imaging controller 30 controls the operation of the signal processor 40 by supplying a control signal to the signal processor 40.

The temperature sensor 31 is a temperature detector that detects temperature of the pixel array 2. The temperature sensor 31 generates a detection signal corresponding to the temperature of the pixel array 2.

In the signal processor 40, the image processor 41 performs predetermined image processing on the image signal DATA0 from the reading unit 20, and outputs the resulting image signal as an image signal DATA.

(Overview of Pixel Structure and Addition Process of Pixel Signals in Imaging Apparatus 1)

FIG. 7 schematically illustrates an example planar configuration of a pixel structure of the imaging pixel P1 in the imaging apparatus 1 according to the first embodiment. FIG. 8 schematically illustrates an example planar configuration of the pixel array 2 in the imaging apparatus 1 according to the first embodiment.

The imaging pixel P1 includes a plurality of partial pixels. The plurality of partial pixels includes a first partial pixel P11, a second partial pixel P12, and a third partial pixel P13. Pixel areas of the first partial pixel P11, the second partial pixel P12, and the third partial pixel P13 are the same. A plurality of first partial pixels P11 are disposed per one imaging pixel P1. Further, at least one second partial pixel P12 is disposed per one imaging pixel P1. Further, at least one third partial pixel P13 is disposed per one imaging pixel P1.

An on-chip lens 51 is disposed on the imaging pixel P1. The on-chip lens 51 may be individually disposed at respective positions corresponding to the first partial pixel P11, the second partial pixel P12, and the third partial pixel P13.

In one imaging pixel P1, the pixel area occupied by the plurality of first partial pixels P11 is larger than the pixel area occupied by the at least one second partial pixel P12 and third partial pixel P13. A first composite pixel area obtained by combining the first partial pixel P11 and the third partial pixel P13 is larger than a second composite pixel area obtained by combining the second partial pixel P12 and the third partial pixel P13. Thus, the first partial pixel P11 has a role corresponding to the large pixel P101 (FIG. 1) in the imaging apparatus according to the comparative example. The second partial pixel P12 has a role corresponding to the small pixel P102 (FIG. 1) in the imaging apparatus according to the comparative example. The third partial pixel P13 is a partial pixel whose role is variable, and has either one role of the role corresponding to the large pixel P101 and the role corresponding to the small pixel P102, in accordance with the temperature of the pixel array 2 detected by the temperature sensor 31. A third partial pixel signal generated from the third partial pixel P13 is added to either one of a first partial pixel signal generated from the first partial pixel P11 and a second partial pixel signal generated from the second partial pixel P12, in accordance with the temperature of the pixel array 2 detected by the temperature sensor 31.

Note that FIGS. 7 and 8 illustrate an example in which, in one imaging pixel P1, only one second partial pixel P12 is disposed in a central portion. However, the position where the second partial pixel P12 is disposed is not limited to the central portion. Further, the number of the second partial pixels P12 is not limited to one.

Further, FIGS. 7 and 8 illustrate a state of the pixels during normal operation. Here, during normal operation corresponds to a case where the temperature of the pixel array 2 detected by the temperature sensor 31 is less than a predetermined temperature. During normal operation, as illustrated in FIGS. 7 and 8, for example, every third partial pixel P13 has the role corresponding to the large pixel P101, and is added to the first partial pixel P11. In FIGS. 7 and 8, N (=an integer of 1 or more) third partial pixels P13 are disposed. However, for convenience, FIGS. 7 and 8 illustrate the first partial pixel P11 and the third partial pixel P13 without discrimination.

FIG. 9 schematically illustrates a first example of a pixel structure and a method of an addition process of pixel signals in the imaging apparatus 1 according to the first embodiment. Note that, for convenience of explanation, FIG. 9 simplifies the pixel structure, and illustrates only one first partial pixel P11, only one second partial pixel P12, and only one third partial pixel P13.

As illustrated in FIG. 9, the imaging apparatus 1 includes a plurality of photodiodes PD1, PD2, and PD3, a plurality of analog circuits AN1, AN2, and AN3, AD converters ADC1, ADC2, and ADC3, and an addition processor 21.

The photodiode PD1 is disposed at a position corresponding to the first partial pixel P11. The photodiode PD2 is disposed at a position corresponding to the second partial pixel P12. The photodiode PD3 is disposed at a position corresponding to the third partial pixel P13.

The photodiodes PD1, PD2, and PD3 are photoelectric converters that generate an amount of electric charge corresponding to an amount of received light and store the electric charge therein. In the imaging apparatus 1, pixel signals corresponding to the amounts of signal charge generated by the photodiodes PD1, PD2, and PD3 are generated. On the photodiode PD1, light condensed by the on-chip lens 51 is incident through the first partial pixel P11. On the photodiode PD2, light condensed by the on-chip lens 51 is incident through the second partial pixel P12. On the photodiode PD3, light condensed by the on-chip lens 51 is incident through the third partial pixel P13. The photodiodes PD1, PD2, and PD3 have the same light-receiving sensitivity.

The analog circuits AN1, AN2, and AN3 each include circuit elements such as a transistor, a capacitor, and a floating diffusion.

The analog circuit AN1 is coupled to the photodiode PD1 and generates an analog pixel signal (first partial pixel signal) corresponding to the electric charge stored in the photodiode PD1. The analog circuit AN2 is coupled to the photodiode PD2 and generates an analog pixel signal (second partial pixel signal) corresponding to the electric charge stored in the photodiode PD2. The analog circuit AN3 is coupled to the photodiode PD3 and generates an analog pixel signal (third partial pixel signal) corresponding to the electric charge stored in the photodiode PD3.

The AD converters ADC1, ADC2, and ADC3 are provided in the reading unit 20. The AD converter ADC1 is coupled to the analog circuit AN1 and generates a digital first partial pixel signal. The AD converter ADC2 is coupled to the analog circuit AN2 and generates a digital second partial pixel signal. The AD converter ADC3 is coupled to the analog circuit AN3 and generates a third digital partial pixel signal.

The addition processor 21 is provided in the reading unit 20. The addition processor 21 adds, for each of the plurality of imaging pixels P1, the third partial pixel signal generated from the third partial pixel P13 to either one of the first partial pixel signal generated from the first partial pixel P11 and the second partial pixel signal generated from the second partial pixel P12, on the basis of the temperature of the pixel array 2 detected by the temperature sensor 31.

For example, the addition processor 21 adds the third partial pixel signal to the first partial pixel signal in a case where the temperature of the pixel array 2 is less than a predetermined temperature, and adds the third partial pixel signal to the second partial pixel signal in a case where the temperature of the pixel array 2 is the predetermined temperature or more. The addition processor 21 adds the third partial pixel signal to either one of the first partial pixel signal and the second partial pixel signal after the conversion into the digital signals by the AD converters ADC1, ADC2, and ADC3.

FIG. 10 schematically illustrates a second example of a pixel structure and a method of an addition process of pixel signals in the imaging apparatus 1 according to the first embodiment. Note that, for convenience of explanation, FIG. 10 simplifies the pixel structure, and illustrates only one first partial pixel P11, only one second partial pixel P12, and only one third partial pixel P13.

FIG. 9 illustrates an example in which the addition processor 21 is provided in the reading unit 20, and performs the addition of the third partial pixel signal generated from the third partial pixel P13 by digital processing, whereas FIG. 10 illustrates an example of adding the third partial pixel signal before conversion into digital signals.

As illustrated in FIG. 10, each of the analog circuits AN1, AN2, and AN3 may be coupled to the addition processor 21, and the addition processor 21 may perform a process of adding the third partial pixel signal, in a state of the analog pixel signals. In the example of FIG. 10, the reading unit 20 is provided with the AD converter ADC1 that converts the analog first partial pixel signal after the addition process by the addition processor 21 into a digital signal, and the AD converter ADC2 that converts the analog second partial pixel signal after the addition process by the addition processor 21 into a digital signal.

FIG. 11 schematically illustrates an example of the relationship between the amount of incident light on the imaging pixel P1 (horizontal axis) and the amount of signal charge (vertical axis) in the imaging apparatus 1 according to the first embodiment. FIG. 12 schematically illustrates a difference in the imaging dynamic range between the imaging apparatus according to the comparative example and the imaging apparatus 1 according to the first embodiment.

FIGS. 11 and 12 illustrate characteristics based on a difference in the number of partial pixels (the first partial pixel P11, the second partial pixel P12, or the third partial pixel P13) in one imaging pixel P1. As the number of partial pixels to be added increases, the amount of signal charge with respect to the amount of incident light increases as illustrated in FIG. 11, because the total pixel area increases. As the number of partial pixels to be added increases, the pixel sensitivity increases, because the total pixel area increases. Therefore, as illustrated in FIG. 12, as the number of partial pixels to be added increases, the imaging dynamic range becomes close to the pixel sensitivity of the large pixel P101 in the imaging apparatus according to the comparative example.

(Specific Example of Pixel Addition Control Based on Temperature)

FIG. 13 illustrates an overview of pixel addition control based on temperature in the imaging apparatus 1 according to the first embodiment.

The imaging apparatus 1 operates in one of a plurality of pixel addition modes, in accordance with the temperature of the pixel array 2 detected by the temperature sensor 31. In the imaging apparatus 1, as the temperature rises, the third partial pixel P13 are added, as the second partial pixels P12, to the second partial pixel P12 having the role corresponding to the small pixel P102 (FIG. 1) in the imaging apparatus according to the comparative example. Thus, when the temperature rises, the noise caused in the second partial pixel P12 corresponding to the small pixel P102 is suppressed. For example, as illustrated in FIG. 13, in a case where the temperature rises to a high temperature, the imaging apparatus 1 sequentially operates in a mode A and a mode B. The mode B is an operation mode in a case where the temperature is higher than in the mode A. Hereinafter, FIGS. 14A, 14B, 14C, 15A, 15B, 15C, 16A, 16B, 16C, 17A, 17B, and 17C illustrate specific examples of an addition state of pixels in the operation modes illustrated in FIG. 13.

FIGS. 14A, 14B, and 14C schematically illustrate a first example of the pixel addition control based on the temperature in the imaging apparatus 1. FIGS. 15A, 15B, and 15C schematically illustrate a second example of the pixel addition control based on the temperature in the imaging apparatus 1. FIGS. 16A, 16B, and 16C schematically illustrate a third example of the pixel addition control based on the temperature in the imaging apparatus 1. FIGS. 17A, 17B, and 17C schematically illustrate a fourth example of the pixel addition control based on the temperature in the imaging apparatus 1.

In FIGS. 14A, 14B, 14C, 15A, 15B, 15C, 16A, 16B, 16C, 17A, 17B, and 17C, (A) illustrates the addition state of the pixels in the operation mode during normal operation, (B) illustrates the addition state of the pixels in the mode A illustrated in FIG. 13, and (C) illustrates the addition state of the pixels in the mode B illustrated in FIG. 13.

FIGS. 14A, 14B, 14C, 15A, 15B, 15C, 16A, 16B, and 16C illustrate examples in which, in one imaging pixel P1, only one second partial pixel P12 is disposed in the central portion. FIGS. 17A, 17B, and 17C illustrate an example in which, in one imaging pixel P1, only one second partial pixel P12 is disposed in a peripheral region.

In the examples of FIGS. 14A, 14B, 14C, 15A, 15B, 15C, 16A, 16B, 16C, 17A, 17B, and 17C, during normal operation, every third partial pixel P13 has the role corresponding to the large pixel P101 (FIG. 1) in the imaging apparatus according to the comparative example, and is added to the first partial pixel P11. For convenience, FIGS. 14A, 14B, 14C, 15A, 15B, 15C, 16A, 16B, 16C, 17A, 17B, and 17C illustrate the first partial pixel P11 and the third partial pixel P13 without distinction.

In the example of FIGS. 14A, 14B, and 14C, with respect to the state of the pixels during normal operation, the third partial pixels P13 disposed around the second partial pixel P12 are sequentially added, as the second partial pixels P12, in the mode A and the mode B.

In the example of FIGS. 15A, 15B, and 15C, with respect to the state of the pixels during normal operation, the third partial pixels P13 disposed in a diagonal direction are sequentially added to the second partial pixel P12 in the mode A and the mode B.

In the example of FIGS. 16A, 16B, and 16C, with respect to the state of the pixels during normal operation, the third partial pixels P13 disposed partly in the diagonal direction and partly in an up/down/left/right direction are sequentially added to the second partial pixel P12 in the mode A and the mode B.

In the example of FIGS. 17A, 17B, and 17C, with respect to the state of the pixels during normal operation, the third partial pixels P13 disposed around the second partial pixel P12 in the peripheral region in the imaging pixel P1 are sequentially added, as the second partial pixels P12, in the mode A and the mode B.

Note that the example illustrated in FIGS. 17A, 17B, and 17C are suitable in a case of performing the addition process on the pixel signals in an analog manner as illustrated in FIG. 10. In a case of performing the addition process on the pixel signals in an analog manner as illustrated in FIG. 10, it is possible to perform the addition process with lower electric power consumption than in a case of performing the addition process on the pixel signals digitally as illustrated in FIG. 9. In the first partial pixel P11, the second partial pixel P12, and the third partial pixel P13, it is preferable to dispose the respective floating diffusions that add electric charge in the vicinities of the photodiodes PD1, PD2, and PD3. Therefore, the third partial pixels P13 to be added to the first partial pixel P11 or the second partial pixel P12 are preferably disposed together, which is likely to impose constraints on pixel arrangement. In contrast, in a case of performing the addition process on the pixel signals digitally as illustrated in FIG. 9, although the reading and addition process of the pixel signals by the reading unit 20 can be more complicated than in a case of performing the addition process on the pixel signals in an analog manner, there are no constraints on the pixel arrangement, and any arrangement of the examples of FIGS. 14A, 14B, 14C, 15A, 15B, 15C, 16A, 16B, 16C, 17A, 17B, and 17C may be used.

In the examples of FIGS. 14A, 14B, 14C, 15A, 15B, 15C, 16A, 16B, and 16C, spatial phase shift between pixels is small between a pixel portion corresponding to the large pixel P101 (FIG. 1) in the imaging apparatus according to the comparative example and a pixel portion corresponding to the small pixel P102 (FIG. 1).

Modification Examples

The shape of each of the first partial pixel P11, the second partial pixel P12, and the third partial pixel P13 is not limited to a circular shape, and may be another shapes, such as a rectangular shape or a polygonal shape. Further, although FIGS. 13, 14A, 14B, 14C, 15A, 15B, 15C, 16A, 16B, 16C, 17A, 17B, and 17C illustrate an example in which the operation mode at high temperature includes two cases of the mode A and the mode B, the operation mode at high temperature may be one or three or more. Further, the number and positions of the third partial pixels P13 to be added in the mode A and the mode B are not limited to the examples illustrated in FIGS. 14A, 14B, 14C, 15A, 15B, 15C, 16A, 16B, 16C, 17A, 17B, and 17C.

1.2 Effects

As described above, in the imaging apparatus 1 according to the first embodiment, on the basis of the temperature of the pixel array 2, the third partial pixel signal generated from the third partial pixel P13 is added to either one of the first partial pixel signal generated from the first partial pixel P11 and the second partial pixel signal generated from the second partial pixel P12. This makes it possible to expand the imaging dynamic range while suppressing the noise caused when temperature rises.

In the imaging apparatus 1 according to the first embodiment, during normal operation, it is possible to obtain imaging dynamic range performance similar to that of the imaging apparatus according to the comparative example (FIGS. 1 to 5). Further, in a case where the noise increases in a combination boundary region due to temperature rise, the addition of the third partial pixel P13 is controlled to reduce a pixel sensitivity ratio between the first partial pixel P11 corresponding to the large pixel P101 and the second partial pixel P12 corresponding to the small pixel P102. This makes it possible to suppress the noise in the combination boundary region without changing the shutter ratio between the first partial pixel P11 and the second partial pixel P12.

It is to be noted that the effects described in this specification are merely illustrative and non-limiting, and other effects may be provided. The same applies to the effects of the following other embodiments.

2. SECOND EMBODIMENT

Next, an imaging apparatus according to a second embodiment of the present disclosure is described. Note that, in the following, substantially the same portions as the components of the imaging apparatus according to the first embodiment are denoted with the same reference numerals, and description thereof will be omitted as appropriate.

FIGS. 18A and 18B schematically illustrate an example of a pixel structure and pixel addition control based on temperature in the imaging apparatus according to the second embodiment.

The first embodiment describes, as an example, a case where the pixel areas of the first partial pixel P11, the second partial pixel P12, and the third partial pixel P13 are the same in one imaging pixel P1, but some or all of the areas of the plurality of partial pixels may be pixel areas different from each other.

In the example illustrated in FIGS. 18A and 18B, in one imaging pixel P1, one first partial pixel P11, one second partial pixel P12, and one third partial pixel P13 are disposed. Further, the pixel area of the first partial pixel P11 is larger than the pixel areas of the second partial pixel P12 and the third partial pixel P13. The first partial pixel P11 is disposed in the central portion in one imaging pixel P1, and the second partial pixel P12 and the third partial pixel P13 are disposed in the peripheral region of the first partial pixel P11.

In FIGS. 18A and 18B, FIG. 18A illustrates an addition state of the pixels in the operation mode during normal operation, and FIG. 18B illustrates an addition state of the pixels in the operation mode at high temperature. During normal operation, the third partial pixel P13 is added as the first partial pixel P11. At high temperature, the third partial pixel P13 is added as the second partial pixel P12.

Modification Examples

FIGS. 18A and 18B illustrate a case where the shape of each of the first partial pixel P11, the second partial pixel P12, and the third partial pixel P13 is a circular shape, but the shape of each of the partial pixels may be another shape, such as a rectangular shape or a polygonal shape. Further, FIGS. 18A and 18B illustrate an example in which the operation mode includes two cases of during normal operation and at high temperature, but the number of the third partial pixels P13 may be increased to two or more and the operation mode at high temperature may be increased to three or more. In addition, the numbers and positions of the partial pixels are not limited to the example illustrated in FIGS. 18A and 18B.

Other configurations, operations, and effects may be substantially similar to those of the imaging apparatus 1 according to the first embodiment.

3. EXAMPLES OF APPLICATION TO MOBILE BODY

The technology according to the present disclosure is applicable to various products. For example, the technology according to the present disclosure may be implemented as a device mounted on any type of mobile body such as an automobile, an electric vehicle, a hybrid electric vehicle, a motorcycle, a bicycle, a personal mobility, an airplane, a drone, a vessel, or a robot.

FIG. 19 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 19, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 19, an audio speaker 12061, a display section 12062, and an instrument panel 12063 are illustrated as the output device. The display section 12062 may, for example, include at least one of an on-board display and a head-up display.

FIG. 20 is a diagram depicting an example of the installation position of the imaging section 12031.

In FIG. 20, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 20 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In vehicle control system 12000 described above, the imaging apparatus of the present disclosure is applicable to, for example, the imaging section 12031 and the driver state detecting section 12041. The application of the technology according to the present disclosure to the imaging section 12031 and the driver state detecting section 12041 makes it possible to obtain image data with an expanded imaging dynamic range while suppressing noise. This makes it possible to improve the accuracy of information acquisition outside and inside the vehicle.

4. OTHER EMBODIMENTS

The technology according to the present disclosure is not limited to the description of the embodiments described above, and various modifications may be made.

For example, the present technology may have the following configurations.

According to the present technology having the following configurations, it is possible to expand an imaging dynamic range while suppressing noise.

(1)
An imaging apparatus including:
a pixel array in which a plurality of pixels including a first partial pixel, a second partial pixel, and a third partial pixel P13 are arranged; and
an addition processor that adds, for each of the pixels, a third partial pixel signal generated from the third partial pixel to either one of a first partial pixel signal generated from the first partial pixel and a second partial pixel signal generated from the second partial pixel, on the basis of a temperature of the pixel array.

(2)
The imaging apparatus according to (1), further including a temperature detector that detects the temperature of the pixel array.

(3)
The imaging apparatus according to (1) or (2), in which the addition processor adds the third partial pixel signal to the first partial pixel signal in a case where the temperature of the pixel array is less than a predetermined temperature, and adds the third partial pixel signal to the second partial pixel signal in a case where the temperature of the pixel array is equal to or greater than the predetermined temperature.

(4)
The imaging apparatus according to any one of (1) to (3), in which a first composite pixel area obtained by combining the first partial pixel and the third partial pixel is larger than a second composite pixel area obtained by combining the second partial pixel and the third partial pixel.

(5)
The imaging apparatus according to any one of (1) to (4), in which
the first partial pixel, the second partial pixel, and the third partial pixel have a same pixel area as each other, and
each of the pixels includes a plurality of the first partial pixels.

(6)
The imaging apparatus according to any one of (1) to (4), in which the first partial pixel has a pixel area larger than a pixel area of the second partial pixel and a pixel area of the third partial pixel.

(7)
The imaging apparatus according to any one of (1) to (6), further including AD converters that convert the first partial pixel signal, the second partial pixel signal, and the third partial pixel signal into respective digital signals, in which
the addition processor adds the third partial pixel signal to either one of the first partial pixel signal and the second partial pixel signal after the conversion into the digital signals by the AD converters.

(8)
The imaging apparatus according to any one of (1) to (6), further including AD converters that convert the first partial pixel signal and the second partial pixel signal into respective digital signals, in which
the addition processor adds the third partial pixel signal to either one of the first partial pixel signal and the second partial pixel signal before the conversion into the digital signals by the AD converters.

(9)
The imaging apparatus according to any one of (1) to (5), (7), and (8), in which, in each of the pixels, the second partial pixel is disposed in a central portion.

(10)
The imaging apparatus according to (9), in which, in each of the pixels, the third partial pixel is disposed around the second partial pixel.

(11)
The imaging apparatus according to any one of (1) to (8), in which, in each of the pixels, the second partial pixel and the third partial pixel are disposed in a peripheral region.

This application claims the benefit of Japanese Priority Patent Application No. 2019-25596 filed with the Japan Patent Office on Feb. 15, 2019, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus comprising:
a pixel array in which a plurality of pixels including a first partial pixel, a second partial pixel, and a third partial pixel are arranged; and
an addition processor that adds, for each of the pixels, a third partial pixel signal generated from the third partial pixel to either one of a first partial pixel signal generated from the first partial pixel and a second partial pixel signal generated from the second partial pixel, on a basis of a temperature of the pixel array.

2. The imaging apparatus according to claim 1, further comprising a temperature detector that detects the temperature of the pixel array.

3. The imaging apparatus according to claim 1, wherein the addition processor adds the third partial pixel signal to the first partial pixel signal in a case where the temperature of the pixel array is less than a predetermined temperature, and adds the third partial pixel signal to the second partial pixel signal in a case where the temperature of the pixel array is equal to or greater than the predetermined temperature.

4. The imaging apparatus according to claim 1, wherein a first composite pixel area obtained by combining the first partial pixel and the third partial pixel is larger than a second composite pixel area obtained by combining the second partial pixel and the third partial pixel.

5. The imaging apparatus according to claim 1, wherein the first partial pixel, the second partial pixel, and the third partial pixel have a same pixel area as each other, and each of the pixels includes a plurality of the first partial pixels.

6. The imaging apparatus according to claim 1, wherein the first partial pixel has a pixel area larger than a pixel area of the second partial pixel and a pixel area of the third partial pixel.

7. The imaging apparatus according to claim 1, further comprising AD converters that convert the first partial pixel signal, the second partial pixel signal, and the third partial pixel signal into respective digital signals, wherein
the addition processor adds the third partial pixel signal to either one of the first partial pixel signal and the second partial pixel signal after the conversion into the digital signals by the AD converters.

8. The imaging apparatus according to claim 1, further comprising AD converters that convert the first partial pixel signal and the second partial pixel signal into respective digital signals, wherein
the addition processor adds the third partial pixel signal to either one of the first partial pixel signal and the second partial pixel signal before the conversion into the digital signals by the AD converters.

9. The imaging apparatus according to claim 1, wherein, in each of the pixels, the second partial pixel is disposed in a central portion.

10. The imaging apparatus according to claim 9, wherein, in each of the pixels, the third partial pixel is disposed around the second partial pixel.

11. The imaging apparatus according to claim 1, wherein, in each of the pixels, the second partial pixel and the third partial pixel are disposed in a peripheral region.

* * * * *